(12) United States Patent
Nakagawa

(10) Patent No.: US 11,842,086 B2
(45) Date of Patent: Dec. 12, 2023

(54) SYSTEM AND CONTROL METHOD

(71) Applicant: CANON KABUSHIKI KAISHA, Tokyo (JP)

(72) Inventor: Masashi Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/822,295

(22) Filed: Aug. 25, 2022

(65) Prior Publication Data

US 2023/0066536 A1     Mar. 2, 2023

(30) Foreign Application Priority Data

Aug. 31, 2021    (JP) ................................ 2021-140736

(51) Int. Cl.
     *G06F 15/00*           (2006.01)
     *G06F 3/12*            (2006.01)

(52) U.S. Cl.
     CPC .......... *G06F 3/1203* (2013.01); *G06F 3/1232* (2013.01); *G06F 3/1273* (2013.01); *G06F 3/1287* (2013.01)

(58) Field of Classification Search
     CPC .... G06F 3/1206; G06F 3/1232; G06F 3/1273; G06F 3/1287

USPC ....................................................... 358/1.15
See application file for complete search history.

(56) References Cited

U.S. PATENT DOCUMENTS

| | | | |
|---|---|---|---|
| 11,119,710 B2 | 9/2021 | Inoue | |
| 2015/0261487 A1* | 9/2015 | Fujii | ..................... G06F 3/1203 358/1.15 |
| 2020/0364010 A1 | 11/2020 | Inoue | |
| 2021/0373822 A1 | 12/2021 | Inoue | |
| 2022/0295248 A1* | 9/2022 | Tomida | .............. H04N 1/32765 |

FOREIGN PATENT DOCUMENTS

JP          2020187700 A     11/2020

* cited by examiner

*Primary Examiner* — Mark R Milia
(74) *Attorney, Agent, or Firm* — Canon U.S.A., Inc. IP Division

(57) ABSTRACT

The present disclosure is directed to providing mechanisms, devices, systems, and methods for registering information about services of a management system and a print system in the management system and the print system based on a registration request for the management system from a client terminal.

6 Claims, 15 Drawing Sheets

FIG.6

PUBLIC SERVICE – USER REGISTRATION — 600

| | | |
|---|---|---|
| NAME | TARO YAMADA | ~601 |
| E-MAIL ADDRESS | aaaa@bbbb.com | ~602 |
| PHONE NUMBER | 03-xxxx-xxxx | ~603 |
| PASSWORD | ●●●●●● | ~604 |
| PASSWORD (CONFIRMATION) | ●●●●●● | ~605 |

USE PRINT FUNCTION  ● YES   ○ NO  ~606

[ CANCEL ] 607   [ REGISTER ] 608

FIG.7A

USER INFORMATION ABOUT PS 103

| USER NAME |
|---|
| E-MAIL ADDRESS |
| PHONE NUMBER |
| PASSWORD |
| USE PRINT FUNCTION (YES/NO) |
| ENTRY INFORMATION (CHECK-IN INFORMATION) |
| USER NAME FOR CPS |
| PASSWORD FOR CPS |

FIG.7B

USER INFORMATION ABOUT CPS 150

| USER NAME |
|---|
| E-MAIL ADDRESS |
| PASSWORD |
| URL FOR PUBLIC SERVICE |
| PIN CODE FOR DEVICE LOGIN |

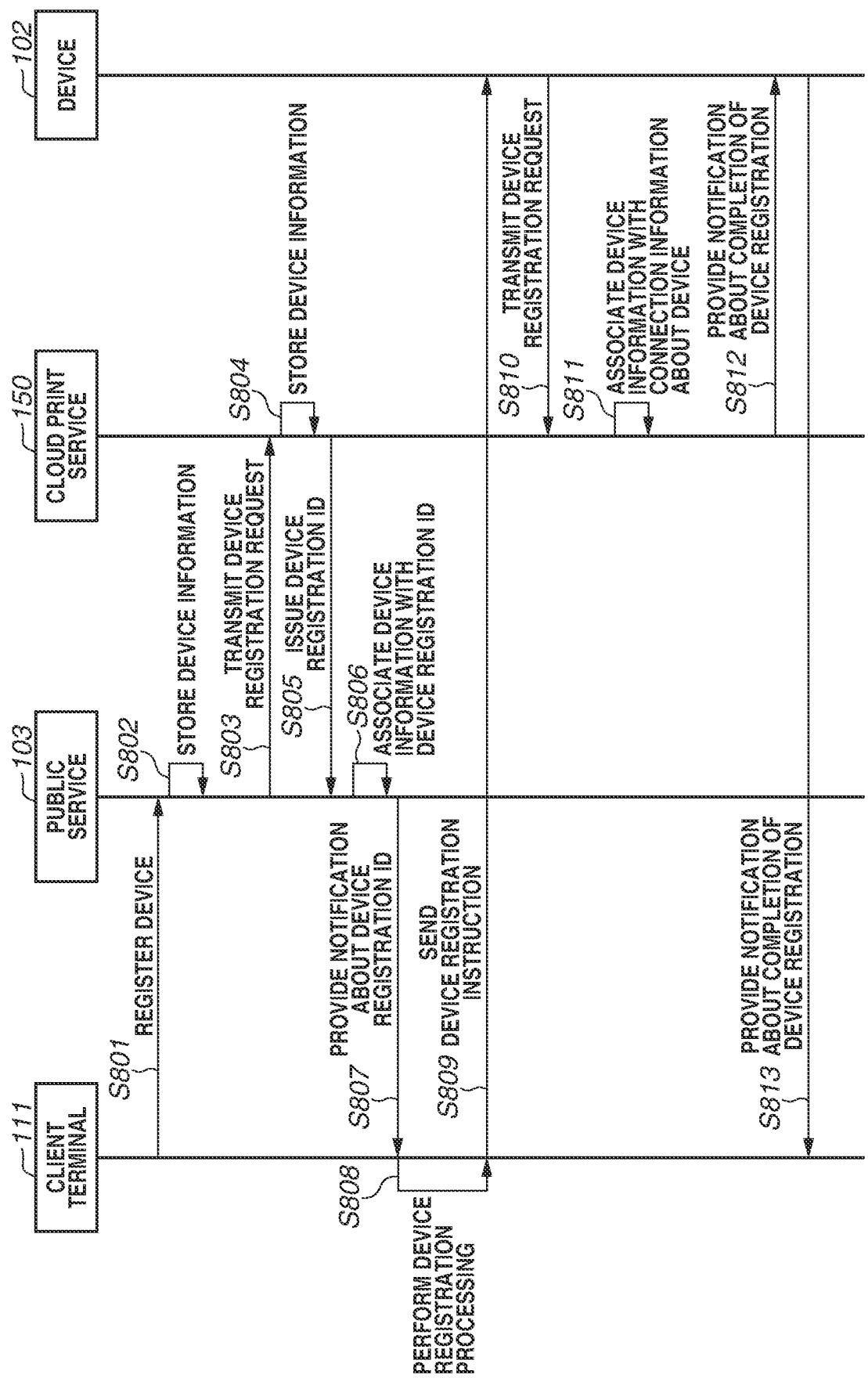

PUBLIC SERVICE – DEVICE REGISTRATION

| | | |
|---|---|---|
| REGISTERED NAME | Canon iR-ADV Cxxxx | ~901 |
| IP ADDRESS | aaa.bbb.ccc.ddd | ~902 |
| MODEL | iR-ADV Cxxxx | ~903 |

COLOR/BLACK AND WHITE  ● COLOR   ○ BLACK AND WHITE ~904

SHEET SIZE   [ UP TO A3  ▽ ] ~905

OPTIONS
- ☐ STAPLING  ~906
- ☐ PUNCHING
- ☐ BOOKBINDING
- ☐ SCANNER
- ☐ FAX

UNIT PRICE INFORMATION   [ INPUT UNIT PRICE INFORMATION ] ~907

908~ [ CANCEL ]    [ REGISTER ] ~909

FIG.10A

DEVICE INFORMATION ABOUT PS 103

| REGISTERED NAME |
|---|
| IP ADDRESS |
| MODEL |
| COLOR/BLACK AND WHITE |
| SHEET SIZE |
| OPTION INFORMATION |
| UNIT PRICE INFORMATION |

FIG.10B

DEVICE INFORMATION ABOUT PS 150

| REGISTERED NAME |
|---|
| IP ADDRESS |
| MODEL |
| SERIAL NUMBER |
| URL FOR PUBLIC SERVICE |
| INSTALLATION DESTINATION SHOP INFORMATION |
| OPTION INFORMATION ABOUT DEVICE |

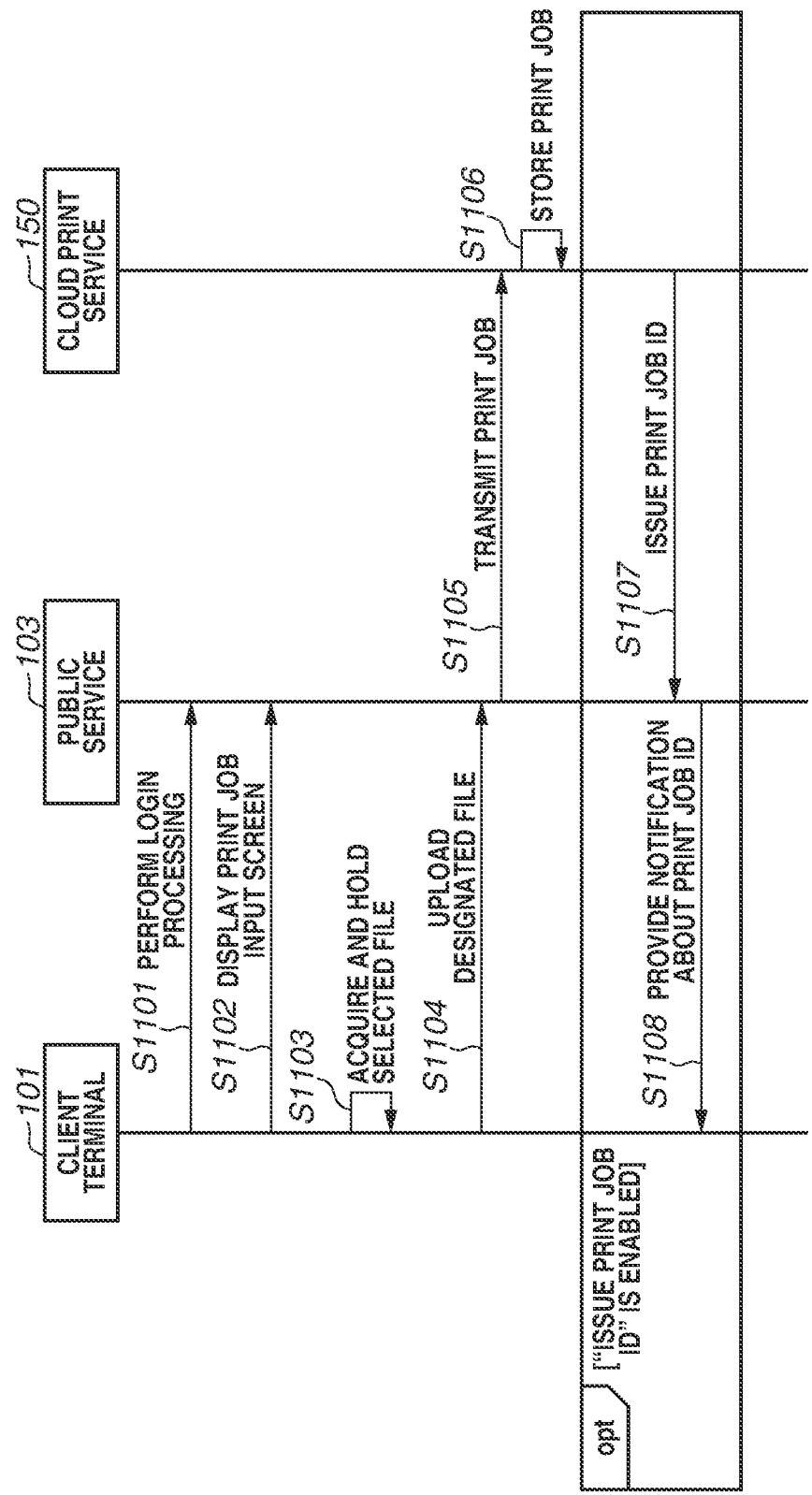

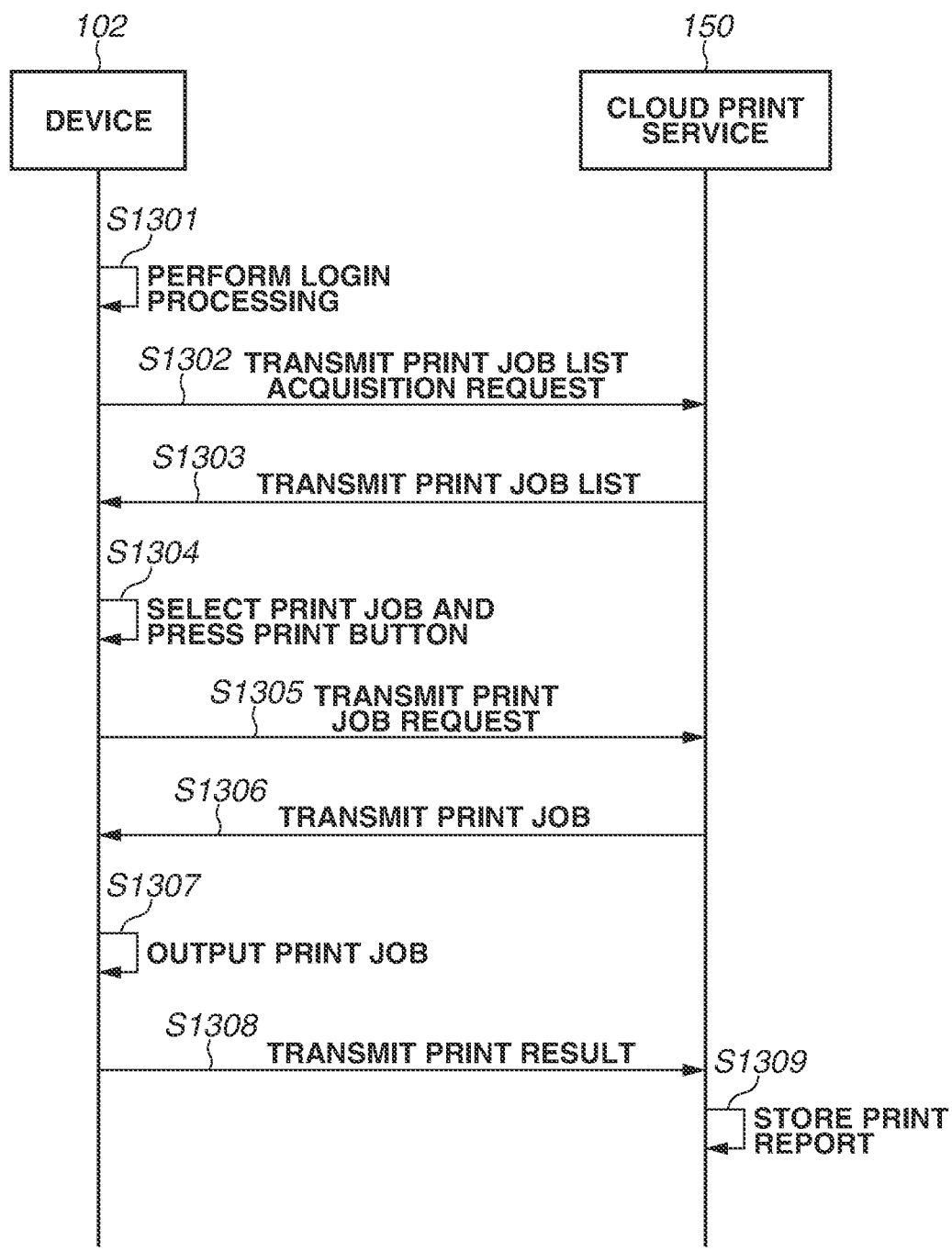

SYSTEM AND CONTROL METHOD

BACKGROUND

Field

The present disclosure relates to a system for performing printing in a public space, and a control method.

Description of the Related Art

In recent years, a cloud print service in which a print job is input via a cloud and the print job is transmitted to an image forming apparatus has been in widespread use. In the following description, an image forming apparatus is also referred to as a device, and both terms have the same meaning. In such a print system, an administrator first registers a device in a tenant of the cloud print service to which the administrator belongs. Then, the administrator sets which one of users belonging to the tenant is allowed to use the device. The term "tenant" used herein refers to a service system to be developed on the cloud by the user. The tenant includes a storage area that is exclusively used by the user, and thus access to the tenant is limited. For example, each employee who works for a certain company A is registered as a user of a tenant of the company A that provides a cloud print service used in the company A, and each device in the company A is also registered. When the user of the company A inputs a print job to the tenant of the company A from a terminal in the company A, the user can execute printing using any one of the devices registered in the tenant of the company A.

Along with the popularization of teleworking, a public space utilization service for using a shop, such as a share office or a karaoke room, as a working space has been developed. There is also a demand for executing printing using a device installed in such a public space. For example, in order to prevent materials to be submitted to customers from being stolen or lost, there are use cases as follows. That is, the customer wishes to print a document in a public space near the customer, or the customer wishes to print materials for a meeting at a share office where the meeting is to be held.

To implement the public space utilization service, there is a need to register information about a printing apparatus to be installed in a public space in a cloud print service and public service (this processing is referred to as device registration). To perform device registration, a shop administrator first registers his or her own shop in the public service. In shop registration processing, the shop administrator needs to register option information about the brief summary and address of the shop, usage charges, self-service drinks, and the like. This information is used for reference by customers to determine the shop in view of the shop location, usage charges, services, and the like when the customers search and make a reservation for the shop using the public service. It is also necessary to register information about devices that can be used in the shop in the option information. The device information includes a model name, sheet feed/discharge option information, printable sheet sizes, color/black-and-white, and usage charges. In order to enable the cloud print service, it is also necessary to register the device information in the cloud print service. The device information includes a model name, sheet feed/discharge option information, and an internet protocol (IP) address.

In this regard, Japanese Patent Application Laid-Open No. 2020-187700 discusses a technique in which a user needs to perform device registration processing on each of cloud print services (CPSs) 104, 105, and 106 and a client terminal accesses a uniform resource locator (URL) for each CPS to send a device registration request.

In the above-described technique discussed in Japanese Patent Application Laid-Open No. 2020-187700, the CPSs 104, 105, and 106 cooperate with each other, but there is a need to perform processing for registering information necessary for services, such as device information, on each of the CPSs 104, 105, and 106. Assume a system in which a management system that provides a shop management service and a print system that provides a print service cooperate with each other. It takes a lot of time and labor for a shop administrator to access both the management system and the print system from a client terminal and to register information necessary for services. Particularly, as for information about the print service, the shop administrator needs to register the same contents in the both systems, which forces the shop administrator to do extra work.

SUMMARY

Accordingly, the present disclosure is directed to providing a mechanism for registering information about respective services of a management system and a print system in the management system and the print system based on a registration request to be sent to the management system from a client terminal.

According to an aspect of the present disclosure, a system includes a client terminal to be operated by a shop administrator, a management system configured to provide a shop management service, and a print system configured to provide a print service, wherein the client terminal includes first one or more memories storing a set of first instructions, and first one or more processors that execute the set of first instructions to transmit a first registration request for registering shop information to the management system, wherein the management system includes second one or more memories storing a set of second instructions, and second one or more processors that execute the set of second instructions to receive the first registration request from the client terminal, register shop information corresponding to the first registration request in the management system, and transmit, to the print system, a second registration request for registering information about the print service included in the shop information corresponding to the first registration request, and wherein the print system includes third one or more memories storing a set of third instructions, and third one or more processors that execute the set of third instructions to receive the second registration request from the management system, and register information about the print service corresponding to the second registration request in the print system.

Further features of various embodiments will become apparent from the following description of exemplary embodiments with reference to the attached drawings.

BRIEF DESCRIPTION OF THE DRAWINGS

FIG. 6 illustrates an example of a user registration screen to be displayed on client terminals during user registration according to the first exemplary embodiment.

FIG. 7A illustrates user information registered in the PS according to the first exemplary embodiment, and FIG. 7B illustrates user information registered in the CPS according to the first exemplary embodiment.

FIG. 8 is a sequence diagram illustrating device registration processing in the PS according to the first exemplary embodiment.

FIG. 9 illustrates an example of a device registration screen to be displayed on the client terminals during device registration according to the first exemplary embodiment.

FIG. 10A illustrates device information registered in the PS according to the first exemplary embodiment, and FIG. 10B illustrates device information registered in the CPS according to the first exemplary embodiment.

FIG. 11 is a sequence diagram illustrating print job input processing in the client terminals according to the first exemplary embodiment.

FIG. 13 is a sequence diagram illustrating processing to be performed when a print job is output from the CPS in the devices according to the first exemplary embodiment.

DESCRIPTION OF THE EMBODIMENTS

Embodiments for carrying out the present disclosure will be described below with reference to the drawings.

In such cases, each customer is generally required to register as a user of a public service that manages a shop to be used by the customer and to make a reservation and perform check-in processing using the public service when the customer uses the shop. Additionally, if the customer uses a device in the shop, there is a need to preliminarily perform user registration in a cloud print service that manages the device. In print job input processing, the user logs in to the cloud print service different from the public service, and inputs a print job by drag-and-drop or the like on a website displayed in the cloud print service. Then, the input print job is designated in the logged-in device, and output processing is executed.

As described above, in the case of using the cloud print service from a public space, such as a coffee shop, it is necessary for each customer to register as a user of both the public service and the cloud print service and to log in to the both services.

Figure 1:
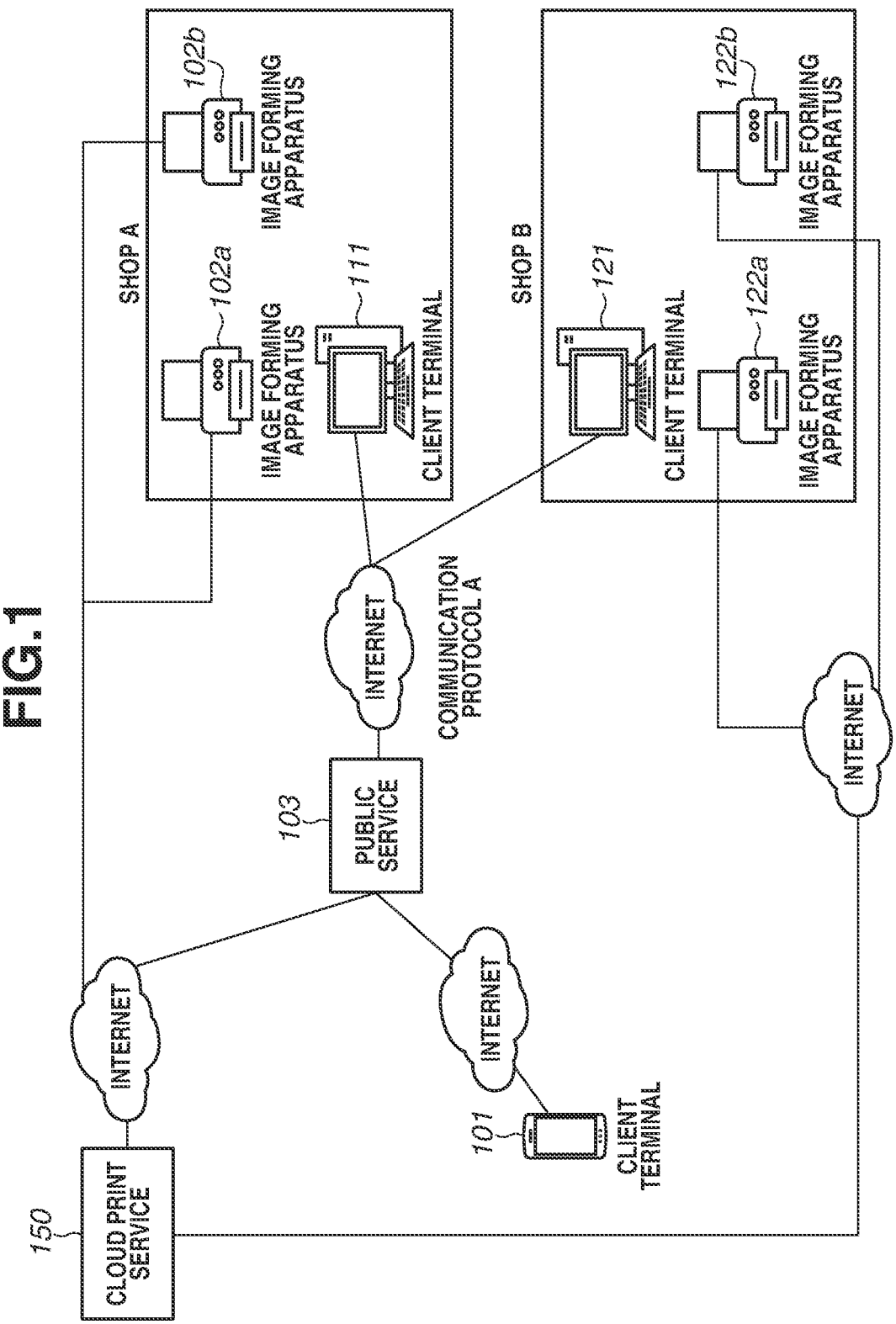
FIG. 1 illustrates an overall system configuration diagram according to a first exemplary embodiment.

FIG. 1 is an overall system configuration diagram according to a first exemplary embodiment of the present disclosure.

A public service (PS) 103 is a management system that provides shop management services, such as services for searching and making a reservation for a shop to be used, and adjusting charges depending on, for example, a period during which the shop is used. A client terminal and devices are located in each of shops A and B that can be used from the PS 103.

The PS 103 provides a print function in cooperation with a cloud print service (CPS) 150, and receives and stores a print job from a client terminal 101. Further, the PS 103 transmits job information to the CPS 150. Upon receiving a print job request from devices 102 (which includes one or both of devices 102a and 102b) and 122 (which includes one or both of devices 122a and 122b), the CPS 150 transmits a print job to the devices 102 and 122. The CPS 150 is a print system that provides a print service. Upon receiving the print job from the CPS 150, the devices 102 and 122 execute printing. The PS 103 receives an instruction to register shop information from client terminals 101, 111, and 121 to be operated by a shop administrator. In this case, the shop information includes positional information about each shop, usage charges, and information about available option information. The option information includes, as information about the print service, the number of printing apparatuses installed in each shop, and available print functions.

Similarly, print jobs can also be transmitted to the PS 103 from the client terminals 111 and 121 in the shops A and B, respectively.

Figure 2:
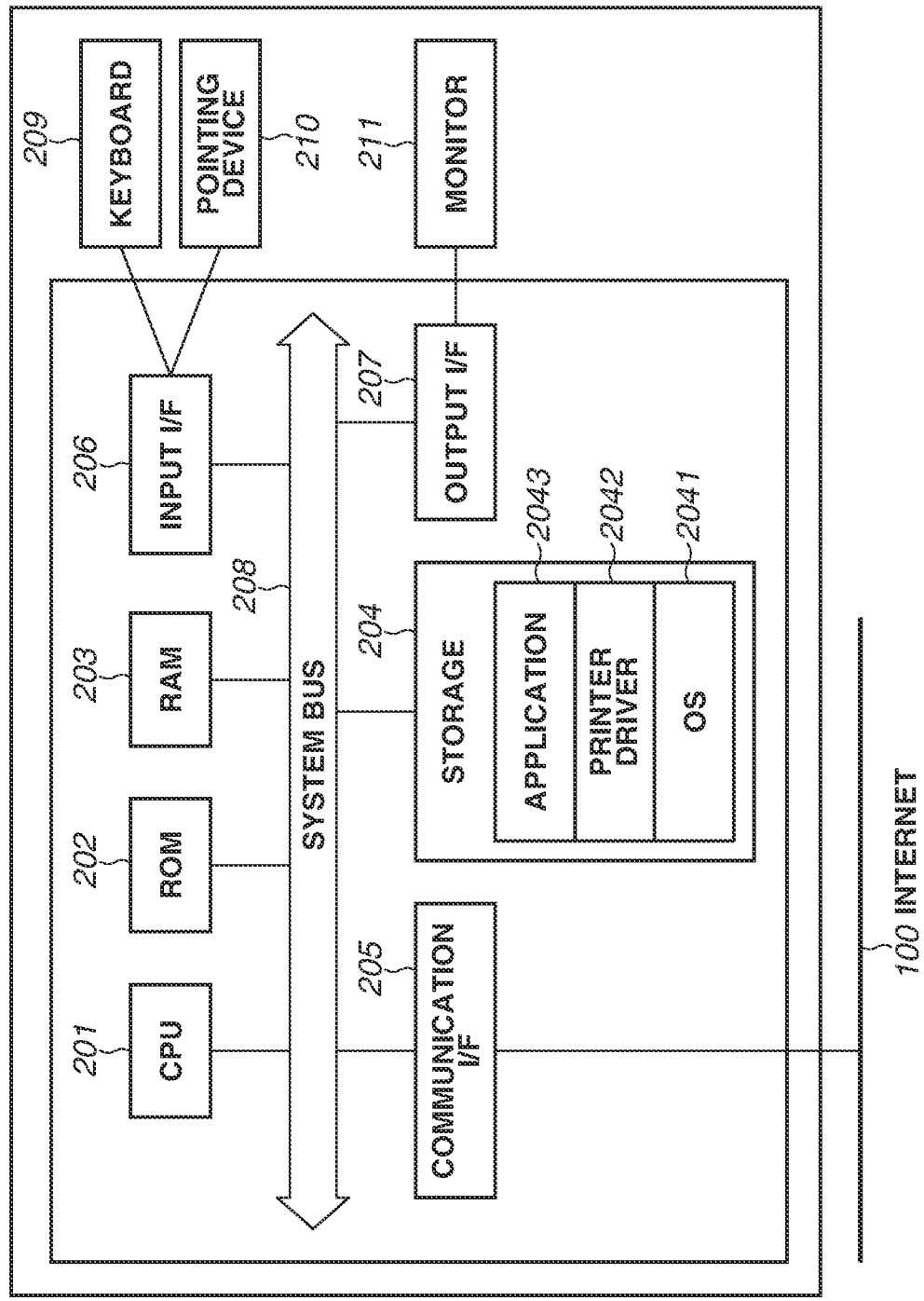
FIG. 2 is a block diagram illustrating a hardware configuration example of each of a public service (PS) and a cloud print service (CPS) according to the first exemplary embodiment.

FIG. 2 is a block diagram illustrating a hardware configuration example of a server computer located on a data center for constructing the PS 103 and the CPS 150 illustrated in FIG. 1. A typical hardware configuration of an information processing apparatus can also be applied to the client terminals 101, 111, and 121 and the image forming apparatuses 102 and 122 according to the present exemplary embodiment.

One or more processors (e.g., a central processing unit (CPU) 201) directly or indirectly control devices (a read-only memory (ROM), a random access memory (RAM), etc.) to be connected with an internal device, thereby executing programs for implementing embodiments of the present disclosure. A ROM 202 stores a basic input/output system (BIOS). A RAM 203 is used as a work area for the CPU 201, or is used as a primary storage for loading software modules for implementing embodiments of the present disclosure. A storage 204 stores an operating system (OS) 2041, an application 2043, and a printer driver 2042 as basic software. Specific examples of the storage 204 include a hard disk drive (HDD) and a solid-state drive (SSD). An output interface (I/F) 207 is an interface for connecting to a monitor 211 and the like. An input I/F 206 is an interface for connecting to a keyboard 209, a pointing device 210, such as a mouse, and the like. A communication I/F 205 is an interface for connecting to the Internet 100 or networks. The PS 103 receives a processing request from each client terminal, each device, and the CPS 150 via the communication I/F 205, performs various kinds of processing, and transmits and receives information.

Figure 3:
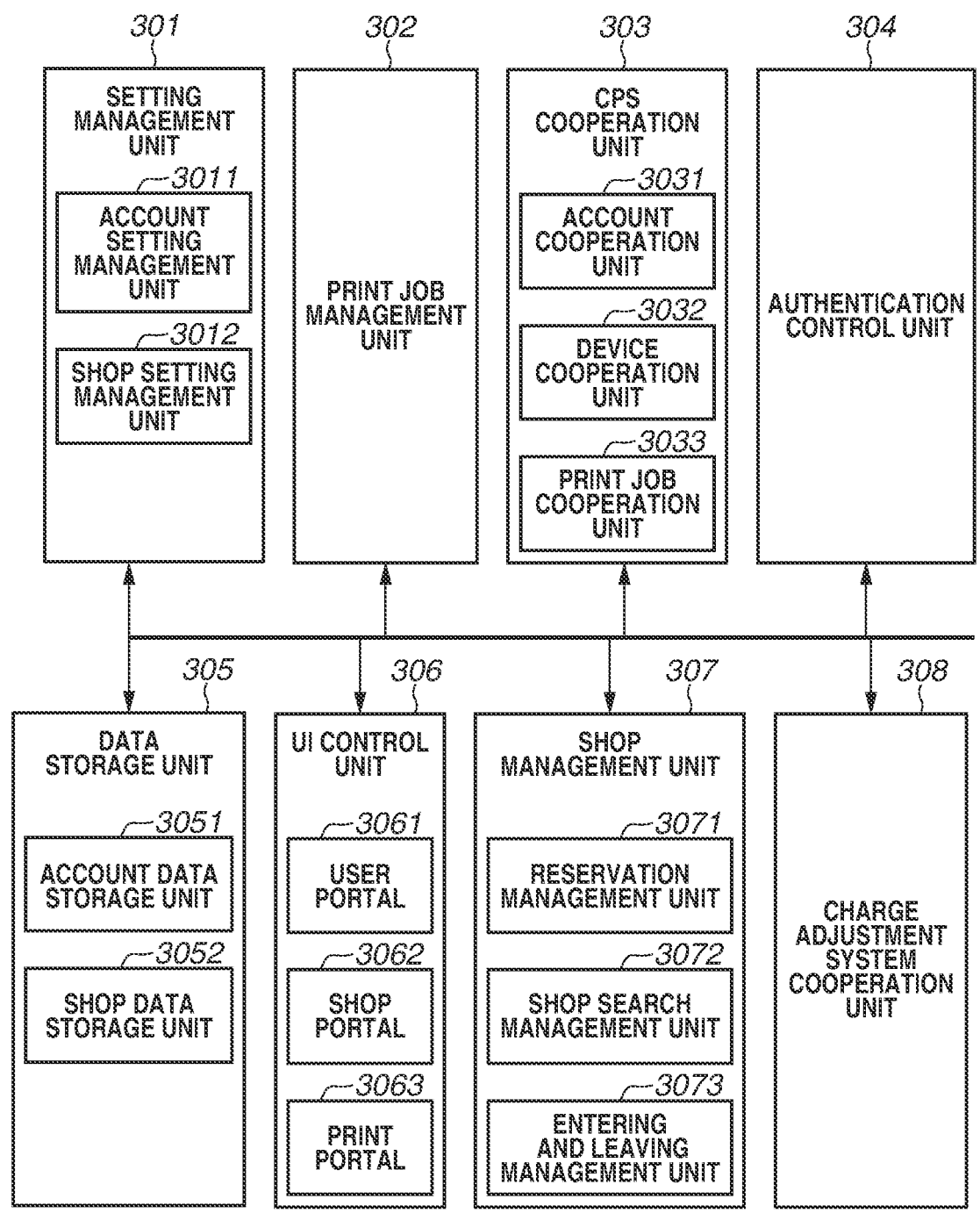
FIG. 3 is a block diagram illustrating a software configuration example of the PS according to the first exemplary embodiment.

FIG. 3 is a block diagram illustrating a software configuration example of the PS 103 according to the first exemplary embodiment.

The software configuration illustrated in FIG. 3 is implemented such that the CPU 201 reads out programs stored in the ROM 202 into the RAM 203 and executes the programs, thereby realizing the various units.

A setting management unit 301 stores settings about various functions of the PS 103 in the storage devices, such as the RAM 203 and the HDD 204, and reads out the settings from the storage devices. The setting management unit 301 includes an account setting management unit 3011 and a shop setting management unit 3012. The account setting management unit 3011 stores user information into an account data storage unit 3051 of a data storage unit 305 during user registration processing. For example, the user information includes an account name, a login password, e-mail information, and information indicating whether the user has checked into the shop. However, the user information is not limited to this example. Further, the account setting management unit 3011 transmits a part of account data to the CPS 150 through an account cooperation unit 3031 of a CPS cooperation unit 303. The shop setting management unit 3012 stores shop information into a shop data storage unit 3052 of the data storage unit 305 when the shop administrator registers his or her own shop. For example, the shop information includes positional information about the shop, charges for using the shop, and amenities. However, the shop information is not limited to this example.

A print job management unit 302 transmits print jobs received from the client terminals 101, 111, and 121 and information associated with the print jobs to the CPS 150 through a print job cooperation unit 3033 of the CPS cooperation unit 303. The print job management unit 302 in the PS 103 determines whether each print job received from the client terminals 101, 111, and 121 permits "printing in a public space", or issues job execution permission information.

The CPS cooperation unit 303 includes the account cooperation unit 3031, a device cooperation unit 3032, and the print job cooperation unit 3033. The account cooperation unit 3031 mainly performs user registration and deletion processing on the CPS 150 and exchanges account information. The device cooperation unit 3032 performs registration and deletion processing on the devices 102 and 122 installed in companies or shops, and exchanges device information about these devices. For example, the device information includes an internet protocol (IP) address of each device, capabilities of each device, and information about the shop in which the devices are installed. However, the device information is not limited to this example. The print job cooperation unit 3033 mainly performs, for example, transmission of a print job to the CPS 150 and reception of a print job ID of the transmitted print job. The print job management unit 302 manages the received print job ID and provides a notification about the print job ID to the user who has executed printing.

An authentication control unit 304 performs login-related control processing, in particular, in the account setting management unit 3011. The authentication control unit 304 may cooperate with an external authentication service.

The data storage unit 305 stores each piece of data in response to a request from the account setting management unit 3011 or the shop setting management unit 3012.

A user interface (UI) control unit 306 generates a screen in response to a request from the client terminals 101, 111, and 121 or the devices 102 and 122, and transmits the generated screen. The UI control unit 306 includes a user portal unit 3061, a shop portal unit 3062, and a print portal unit 3063. For example, the UI control unit 306 performs display through the user portal unit 3061 in response to a request from a browser of the client terminal 101. The shop portal unit 3062 is mainly used by the shop administrator to input shop information or check a shop utilization status. The print portal unit 3063 is displayed on the monitor 211 of each of the client terminals 101, 111, and 121 so that a print job can be input by drag-and-drop, or the print job status can be checked.

A shop management unit 307 includes a reservation management unit 3071, a shop search management unit 3072, and an entering and leaving management unit 3073. The reservation management unit 3071 manages reservations to use the shop through the user portal unit 3061. The shop search management unit 3072 searches for a shop according to a user's demand based on, for example, information stored in the shop data storage unit 3052 and current shop reservation information. The shop search management unit 3072 can also be used to, for example, display a map, recognize the current position of the user, search for shops near the user, or search for shops in the vicinity of a designated location. The entering and leaving management unit 3073 manages check-in/check-out information about the user who has made a reservation.

A charge adjustment system cooperation unit 308 calculates costs depending on the utilization status of the shop by the user, and adjusts incurred costs in cooperation with external services.

Figure 4:
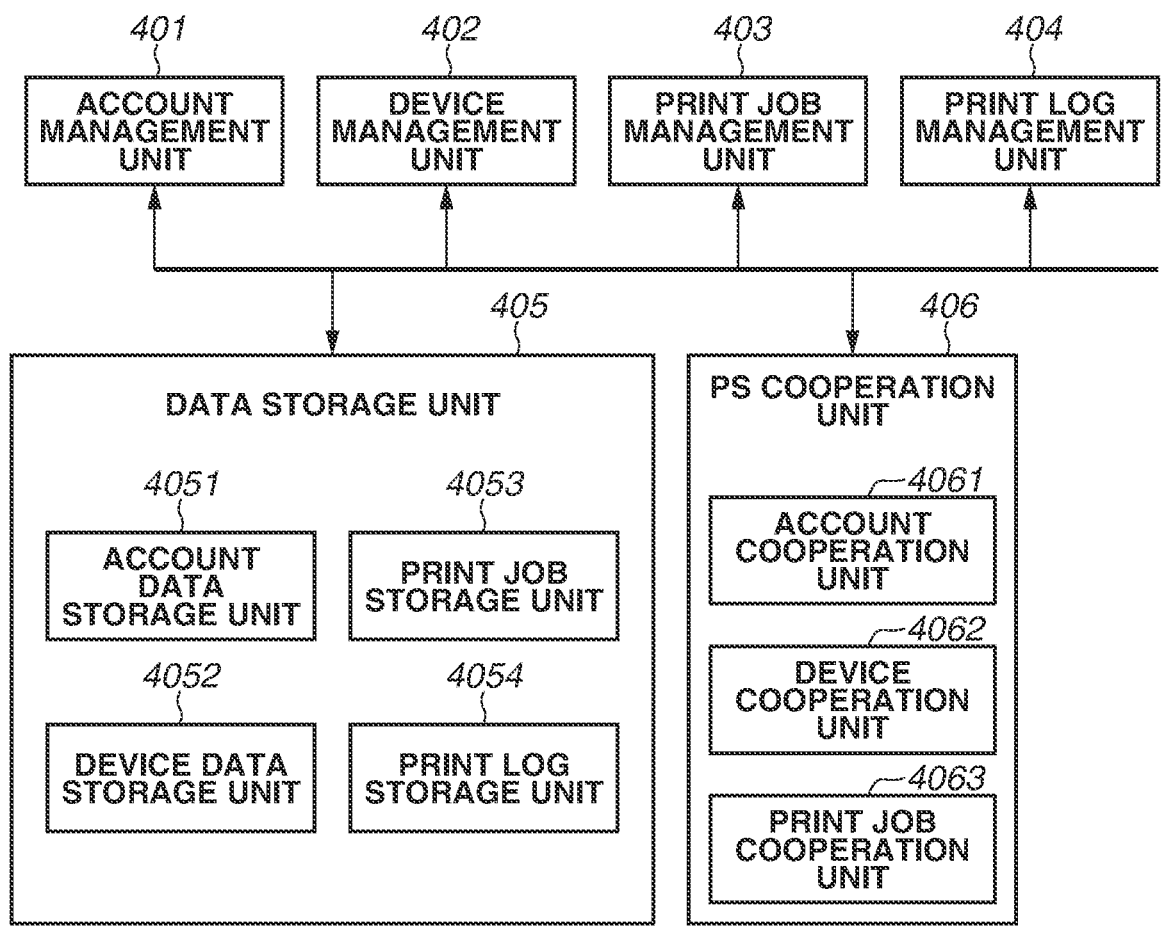
FIG. 4 is a block diagram illustrating a software configuration example of the CPS according to the first exemplary embodiment.

FIG. 4 is a block diagram illustrating a software configuration example of the CPS 150 according to the first exemplary embodiment.

The software configuration illustrated in FIG. 4 is implemented such that the CPU 201 reads out programs stored in, for example, the ROM 202 into the RAM 203, and executes the programs.

An account management unit 401 performs account registration/deletion and manages an account login status. The registered account information is stored in an account data storage unit 4051 of a data storage unit 405. The account management unit 401 registers or deletes the designated user and exchanges user information about the designated user through an account cooperation unit 4061 of a PS cooperation unit 406.

A device management unit 402 registers or deletes a device and manages the utilization status of the device. The registered device information is stored in a device data storage unit 4052 of the data storage unit 405. The device management unit 402 exchanges designated device information through a device cooperation unit 4062 of the PS cooperation unit 406.

The print job management unit 403 receives or transmits a print job. The print job management unit 403 stores the received print job into a print job storage unit 4053 of the data storage unit 405, and transmits the print job to the designated device in response to a request from the devices 102 and 122. The print job management unit 403 can also receive a print job through a print job cooperation unit 4063 of the PS cooperation unit 406.

A print log management unit 404 acquires a print log from the devices 102 and 122. A print log indicates contents set and output by the user. Examples of the contents include the size of each sheet to be printed, color or black-and-white, and double-sided printing or one-sided printing. Previous print logs can be stored into an external storage as a print report at predetermined intervals. This enables an external public service, such as a PS, to incur a printing charge as a cost.

The data storage unit 405 uses storage devices, such as the RAM 203 and the HDD 204 in the CPS 150, and stores account information, device information, and the like. The data storage unit 405 includes the account data storage unit 4051, the device data storage unit 4052, the print job storage unit 4053, and a print log storage unit 4054. The account data storage unit 4051 stores account-related information. The account information is information about the user registered in the CPS 150, and includes information for identifying the user, a division to which the user belongs, and an account authority. The device data storage unit 4052 stores device information about the device registered in the CPS 150. The device information includes a model name of the device, information for identifying the device, and positional information about the device. The print job storage unit 4053 stores the print job stored in the CPS 150 and bibliographic information about the print job. The print log storage unit 4054 stores the printing result acquired from the device to which the print job has been output.

The PS cooperation unit 406 includes the account cooperation unit 4061, the device cooperation unit 4062, and the print job cooperation unit 4063. The account cooperation unit 4061 mainly receives user registration/deletion/change instructions from the PS 103, and exchanges account information. The device cooperation unit 4062 receives registration/deletion instructions of the devices 102 and 122 from the PS 103. The print job cooperation unit 4063 mainly receives a print job from the PS 103, and issues and transmits the print job ID of the received print job. The print job management unit 403 manages the issued print job ID and transmits the print job to the designated device in response to a request from the designated device.

Figure 5:
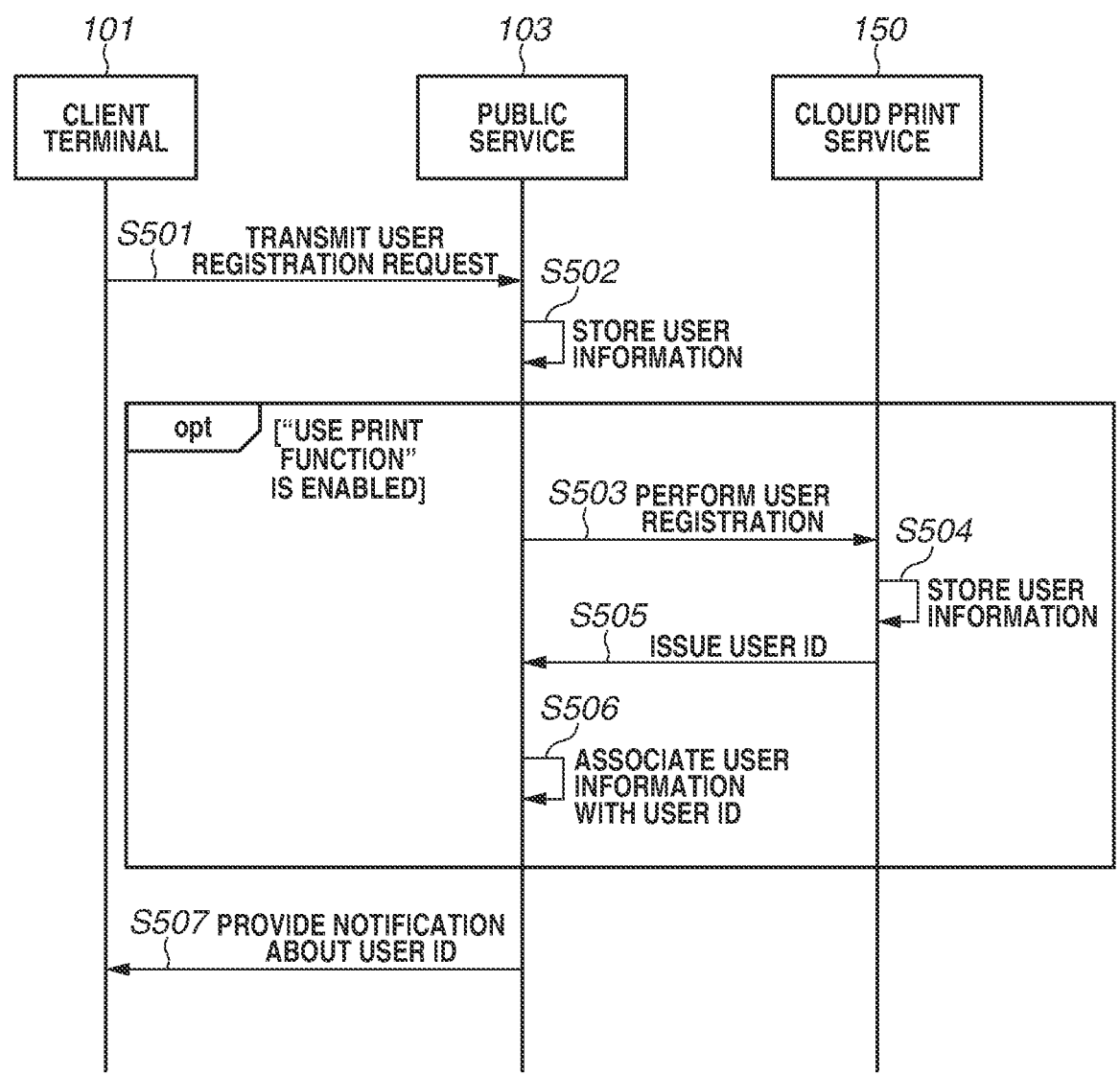
FIG. 5 is a sequence diagram illustrating user registration processing in the PS according to the first exemplary embodiment.

FIG. 5 is a sequence diagram illustrating user registration processing in the PS 103 according to the first exemplary embodiment.

For example, a use case where user information is input and registered in the PS 103 using an application in the client terminal 101 will be described. In step S501, the user inputs necessary items on a user registration screen 600 that is illustrated in FIG. 6 and is displayed on the client terminal 101, and the user presses a registration button, thereby issuing a user registration request. The user registration screen 600 will be described in more detail below with reference to FIG. 6. In step S502, the account setting management unit 3011 in the PS 103 stores the user information input by the user into the account data storage unit 3051 in the PS 103. In step S503, if "Yes" is set for "Use Print Function" on the user registration screen 600 illustrated in FIG. 6, user registration processing is performed on the CPS 150 through the account cooperation unit 3031 in the PS 103. In step S504, the account management unit 401 in the CPS 150 receives user information through the account cooperation unit 4061 and stores the user information into the account data storage unit 4051. After completion of user registration processing, in step S505, the account management unit 401 in the CPS 150 issues a user ID and a password and transmits the issued user ID and password to the PS 103. In step S506, the user ID and password issued in the CPS 150 are associated with the account information stored in step S502. In step S507, a notification about the user ID and password associated with the account information is provided. In step S505, the CPS 150 may issue a personal identification number (PIN) code for device login. In step S507, the PIN code, as well as the user ID and password, can be displayed, or a notification about the PIN code may be provided to a registered e-mail address by e-mail.

FIG. 6 illustrates an example of the user registration screen 600 to be displayed on the client terminals 101, 111, and 121 during user registration according to the first exemplary embodiment.

Assume that this screen is displayed on the user portal unit 3061 in the PS 103. The example of the user registration screen 600 is configured to input a name 601, an e-mail address 602, a phone number 603, and passwords 604-605. The user registration screen 600 also includes a select item 606 indicating whether to use a print function. After inputting data to all items, the user presses a registration button 608 to start registration processing on the PS 103. The user registration screen 600 also includes a cancel button 607 to cancel the user registration.

FIGS. 7A and 7B each illustrate an example of user information registered in the PS 103 and the CPS 150 according to the first exemplary embodiment.

FIG. 7A illustrates user information registered in the account data storage unit 3051 in the PS 103. FIG. 7A illustrates information to be stored, such as a user name, an e-mail address, a password, whether to use the print function, entry information, a user name for the CPS 150, and a password for the CPS 150. However, the information is merely an example and is not limited to this example. The entry information includes information about the shop for which the user has made a reservation, and check-in time. The user name for the CPS 150 indicates the user name registered in the CPS 150, and the password for the CPS 150 indicates the password issued as a result of registration only when "Use Print Function" is enabled ("Yes" is selected). As the user name, it may be desirable to set a unique user name that is different from the other user names already registered in the CPS 150. For example, a combination of a uniform resource locator (URL) for the PS 103 and the user name registered in the PS 103 can be used as the user name.

FIG. 7B illustrates user information registered in the account data storage unit 3051 in the CPS 150. The user information illustrated in FIG. 7B includes a user name, an e-mail address, a password, a URL for cooperating with the public service, and a PIN code for device login. The user name and mail address are user information to be transmitted as input parameters from the PS 103. The password is used to log in to the CPS 150. The password may be input from the PS 103, or may be issued by the CPS 150. The URL for the public service 103 is used to send an inquiry about the user information. The PIN code for device login indicates a PIN code used for the user to log in to the device when the user selects and outputs a print job.

FIG. 8 is a sequence diagram illustrating device registration processing in the PS 103 according to the first exemplary embodiment. For example, a use case where device information in shop information registered in the PS 103 using an application by the client terminals 111 and 121 for the shop administrator is input and registered will be described.

In step S801, the shop administrator inputs information about a shop to be registered using the client terminals 111 and 121, and transmits a registration request from the client terminal 111 to the PS 103. Examples of the shop information include positional information, usage charges, and option information (such as information about self-service drinks). Only device information in the option information will now be described. The other options are provided by typical public services, and thus the descriptions thereof are omitted. As illustrated in FIG. 9, the device information includes a registered name 901 and an IP address 902. The device information will be described in more detail below with reference to FIG. 9. On a screen illustrated in FIG. 9, a set of device information is input and a registration button 909 is pressed to thereby register the device.

In step S802, the setting management unit 301 in the PS 103 stores the device information corresponding to the registration request received in step S801 into the shop data storage unit 3052 in the PS 103. In step S803, the setting management unit 301 in the PS 103 transmits a device registration request to the CPS 150 through the device cooperation unit 3032. The setting management unit 301 in the PS 103 may transmit information related to the print service in the shop information registered from the designated client terminal in step S801 to the CPS 105, and may prevent information that is irrelevant to the print service from being transmitted to the CPS 105.

In step S804, the device management unit 402 in the CPS 150 receives device information through the device cooperation unit 4062 and stores the device information into the device data storage unit 4052. After completion of device registration processing, in step S805, the device management unit 402 in the CPS 150 issues a device registration ID and transmits the device registration ID to the PS 103. The device registration ID is a registration key that enables output of a print job when the device registration ID is input to the registration target device in the shop and the CPS 150 and the device cooperate with each other. In step S806, the device registration ID issued by the CPS 150 is associated with the device information stored in step S802. In step S807, a notification about the device registration ID associated with the device information is provided.

In step S808, the client terminals 111 and 121 that have received the notification about the device registration ID perform device registration processing using the application started during device registration. Specifically, in step S809, a notification about the device registration ID is provided to the devices 102 and 122 to be registered, and an instruction to register the devices 102 and 122 in the CPS 150 is issued. In step S809, the shop administrator or the user may input the device registration ID from the operation unit of the designated device. In step S810, the device 102 and 122 that have received the device register instruction communicate with the CPS 150 based on the device registration ID to request registration of the devices 102 and 122. In step S810, the devices 102 and 122 transmit connection information for connecting to the CPS 150. In step S811, the CPS 150 associates the connection information requested from the devices 102 and 122 with the device information stored in step S804. In step S812, after completion of device registration processing, a registration completion notification is provided to the devices 102 and 122. In step S813, the devices 102 and 122 that have received the registration completion notification provide a registration completion notification to the client terminals 111 and 121.

FIG. 9 illustrates an example of a device registration screen to be displayed on the client terminals 111 and 121 during device registration according to the first exemplary embodiment.

A device registration screen 900 is a part of a shop information registration screen displayed on the shop portal unit 3062 in the PS 103. The device registration screen 900 includes the registered name 901, the IP address 902, and a model 903 as items where device information about each device is input. The device registration screen 900 also includes, as device capability information, a color/black-and-white setting 904, a printable sheet size 905, and an item 906 for setting options. An input of unit price information to an item 907 enables calculation of a usage charge for printing. After completion of data input to all items, the user presses the registration button 909 to start registration processing on the PS 103. Assume that at least one of device information about each device and capability information about each device is registered as device information through the device registration screen 900. The device registration screen 900 further includes a cancel button 908 to cancel the device registration.

FIG. 10A illustrates an example of device information registered in the PS 103 according to the first exemplary embodiment, and FIG. 10B illustrates an example of device information registered in the CPS 150 according to the first exemplary embodiment.

FIG. 10A illustrates device information registered in the shop data storage unit 3052 in the PS 103. The device information illustrated in FIG. 10A includes a registered name, an IP address, a model, color/black-and-white, a sheet size, option information, and unit price information. The device information is merely an example and the device information is not limited to this example.

FIG. 10B illustrates device information registered in the device data storage unit 4052 in the CPS 150. The device information illustrated in FIG. 10B includes a registered name, an IP address, a model, a serial number, a URL for the PS 103, installation destination shop information, and device option information.

FIG. 11 is a sequence diagram illustrating print job input processing on the client terminals 101, 111, and 121 according to the first exemplary embodiment.

This processing is implemented such that the user logs in to the PS 103 from the client terminals 101, 111, and 121, moves to the print portal unit 3063 from the user portal unit 3061 in the PS 103, and executes print processing from the print portal unit 3063.

Figure 12A:
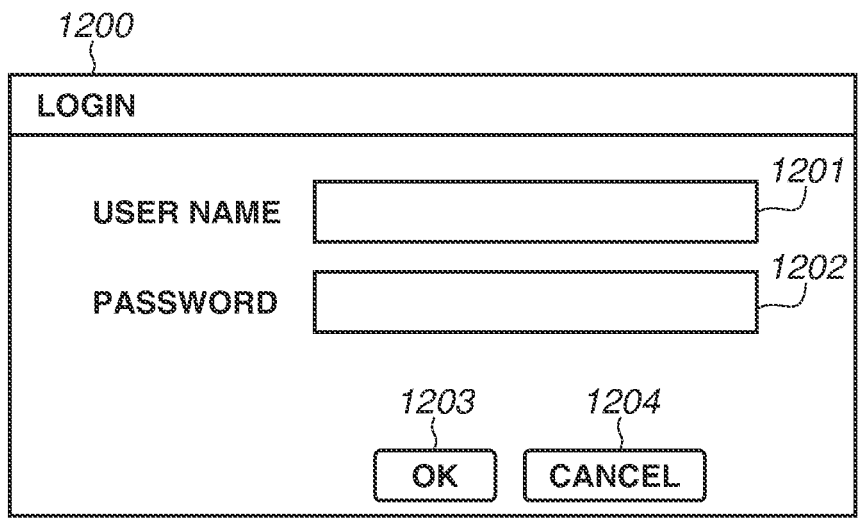
FIGS. 12A to 12C illustrate an example of a group of operation screens to be displayed when a print job is input in the client terminals according to the first exemplary embodiment.
Figure 12B:
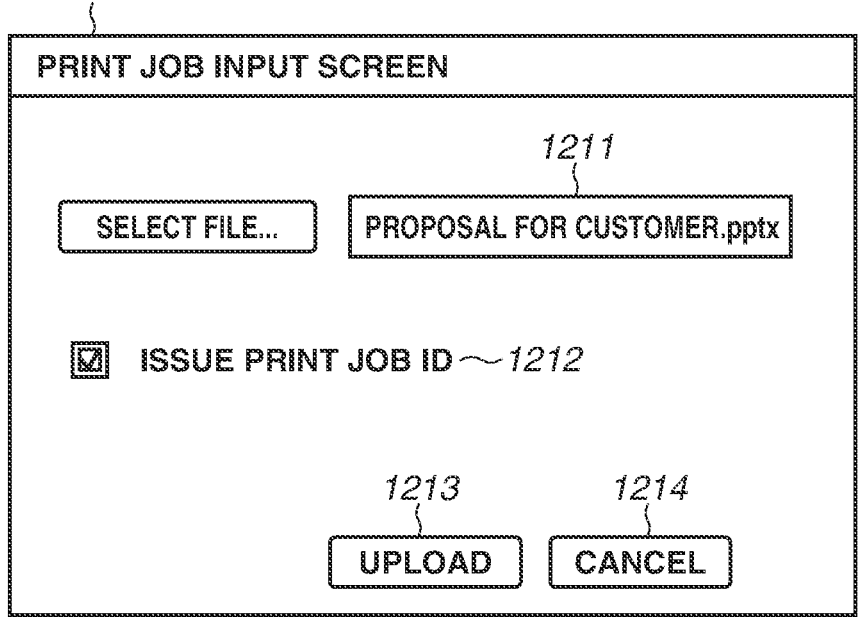
Figure 12C:
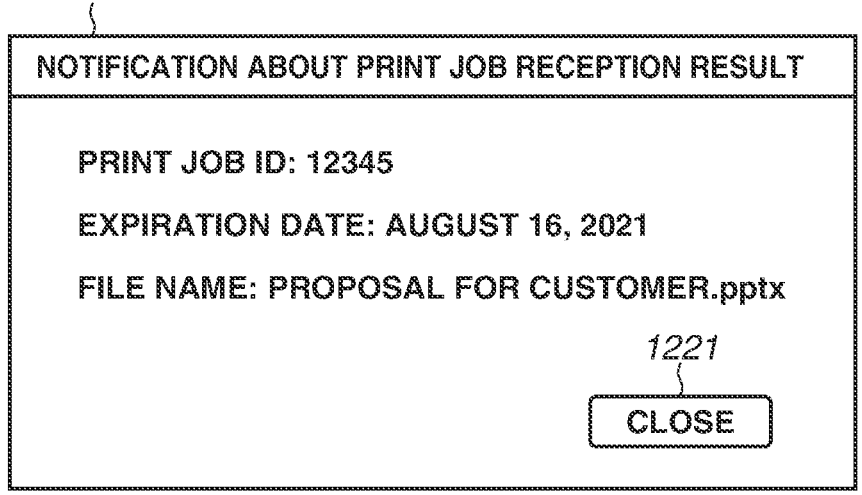

In step S1101, the user inputs a user ID 1201 and a password 1202 on a login screen 1200 as illustrated in FIG. 12A and presses an OK button 1203 for sending a login execution instruction so that the client terminal 101 performs login processing on the PS 103. The login screen 1200 further includes a cancel button 1204 to cancel the login processing. In step S1102, when the user executes an operation to start print processing, the client terminal 101 issues a print screen display request to the PS 103, so that a print job input screen 1210 as illustrated in FIG. 12B is displayed on the client terminal 101. In S1103, a file 1211 for which printing is executed can be selected by pressing a file select button. Any file, such as a file stored in the client terminal 101, or a file stored in an external cloud storage, can be selected. In step S1103, the client terminal 101 acquires and holds information about the file selected by the user. The file information includes a file name and a file path. In step S1104, an upload button 1213 on the print job input screen 1210 is pressed to upload the designated file to the PS 103. When a cancel button 1214 is pressed, the print processing is cancelled. In step S1105, the print job management unit 302 in the PS 103 that has received the file transmits the file to the CPS 150 through the print job cooperation unit 3033. In this case, if an "Issue Print Job ID" item 1212 illustrated in FIG. 12B is enabled, a request for issuance of a print job ID is also transmitted. In step S1106, the print job management unit 403 in the CPS 150 generates a print job based on the file received through the print job cooperation unit 4063, and stores the generated print job into the print job storage unit 4053. In this case, if the request for issuance of a print job ID is transmitted, in step S1107, the print job management unit 403 issues the print job ID and provides a notification about the print job ID to the PS 103. In step S1108, the PS 103 provides a notification about the received print job ID to the user. As a method for providing the user with the notification, the print job ID, as well as an expiration date for the print job and a file name of the received file, may be displayed on a print job reception result notification screen 1220 as illustrated in FIG. 12C. When a close button 1221 is pressed, the print job reception result notification screen 1220 is closed. Alternatively, the notification may be sent to a registered e-mail address by e-mail. However, the notification method is not limited only to these methods.

FIGS. 12A to 12C illustrate an example of a group of operation screens to be displayed when a print job is input in the client terminals 101, 111, and 121 according to the first exemplary embodiment.

Screen operations for the print job input processing on the respective screens illustrated in FIGS. 12A, 12B, and 12C are described above with reference to FIG. 11, and thus the descriptions thereof are omitted.

FIG. 13 is a sequence diagram illustrating processing to be performed when a print job is output from the CPS 150 in the devices 102 and 122 according to the first exemplary embodiment.

This processing is implemented such that the user logs in to the devices 102 and 122 and executes print processing.

Figure 14A:
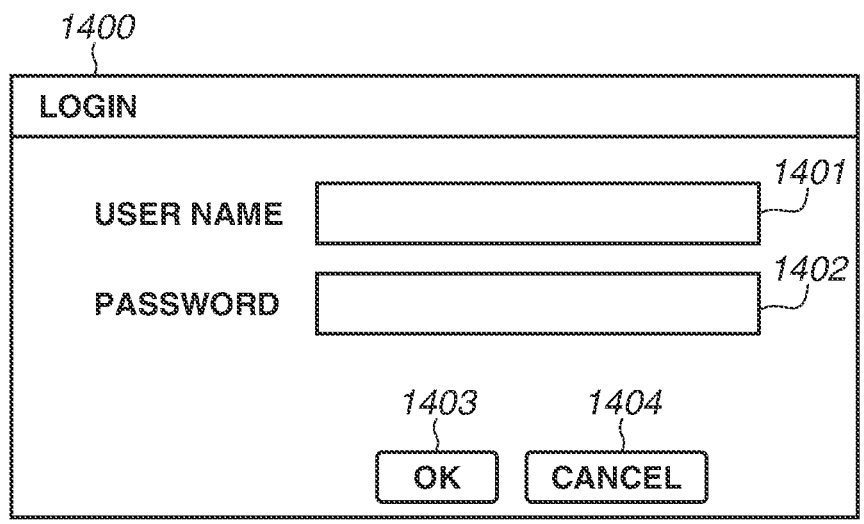
FIGS. 14A and 14B illustrate an example of a group of operation screens to be displayed when a print job is output in the devices according to the first exemplary embodiment.
Figure 14B:
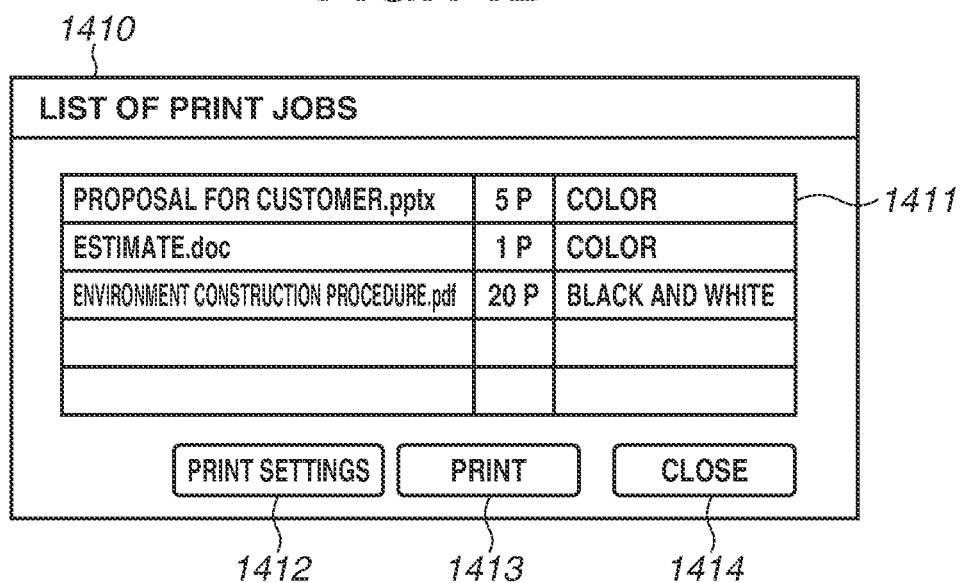

In step S1301, the user inputs a user ID 1401 and a password 1402 on a login screen 1400 as illustrated in FIG. 14A, and performs login processing when an OK button 1403 is pressed. The login screen 1400 further includes a cancel button 1404 to cancel the login processing. In step S1302, a request for acquiring a list of print jobs preliminarily input by the user that has logged in is transmitted to the CPS 150. In step S1303, the print job management unit 403 in the CPS 150 that has received the request creates a list of print jobs associated with the user and transmits the created list. In step S1304, the list of print jobs received from the CPS 150 is displayed on a panel of each device. As a display method, for example, a list 1411 including job names of print jobs and the number of pages in each print job is displayed on a print job list display screen 1410 as illustrated in FIG. 14B. The print job list display screen 1410 further includes a print settings button 1412 for displaying a print setting screen to change print settings based on the user's instruction. The print job list display screen 1410 also includes a close button 1414 to close the print job list display screen 1410. In step S1304, the user selects a print job to be output and presses a print button 1413. In step S1305, the devices 102 and 122 receive a print instruction and transmit a request for acquiring a target print job to the CPS 150. In step S1306, the print job management unit 403 in the CPS 150 transmits the target print job stored in the print job storage unit 4053 to the devices 102 and 122. In step S1307, the transmitted print job is output. After completion of output processing, in step S1308, the output result is transmitted to the CPS 150. In step S1309, the print log management unit 404 in the CPS 150 stores the transmitted output result into the print log storage unit 4054 as a print report.

FIGS. 14A and 14B illustrate an example of a group of operation screens to be displayed when a print job is output in the devices 102 and 122 according to the first exemplary embodiment.

Screen operations for the print job output processing on the respective screens illustrated in FIGS. 14A and 14B are described above with reference to FIG. 13, and thus the descriptions thereof are omitted.

The present exemplary embodiment described above illustrates a method in which the public service including no printing management service enables printing from the public service in cooperation with the cloud print service. According to the present exemplary embodiment, the user who uses the public service can use the print service with the same account. Additionally, the user can input a print job from a portal site of the public service. The shop administrator can register a printer on the cloud print service only by inputting device information to the public service.

In the first exemplary embodiment, the public service including no printing management service cooperates with the cloud print service to thereby enable printing from the public service. However, a printing charge incurred based on the printing result needs to be paid separately from usage charges for using the public service. Thus, the user needs to pay the printing charge and the usage charges for using the public service separately, which is troublesome for the user.

In view of the above-described issue, a second exemplary embodiment provides a charge adjustment system for totalizing the printing charge and usage charges for using the public service to enable the user to pay these charges at once.

Figure 15:
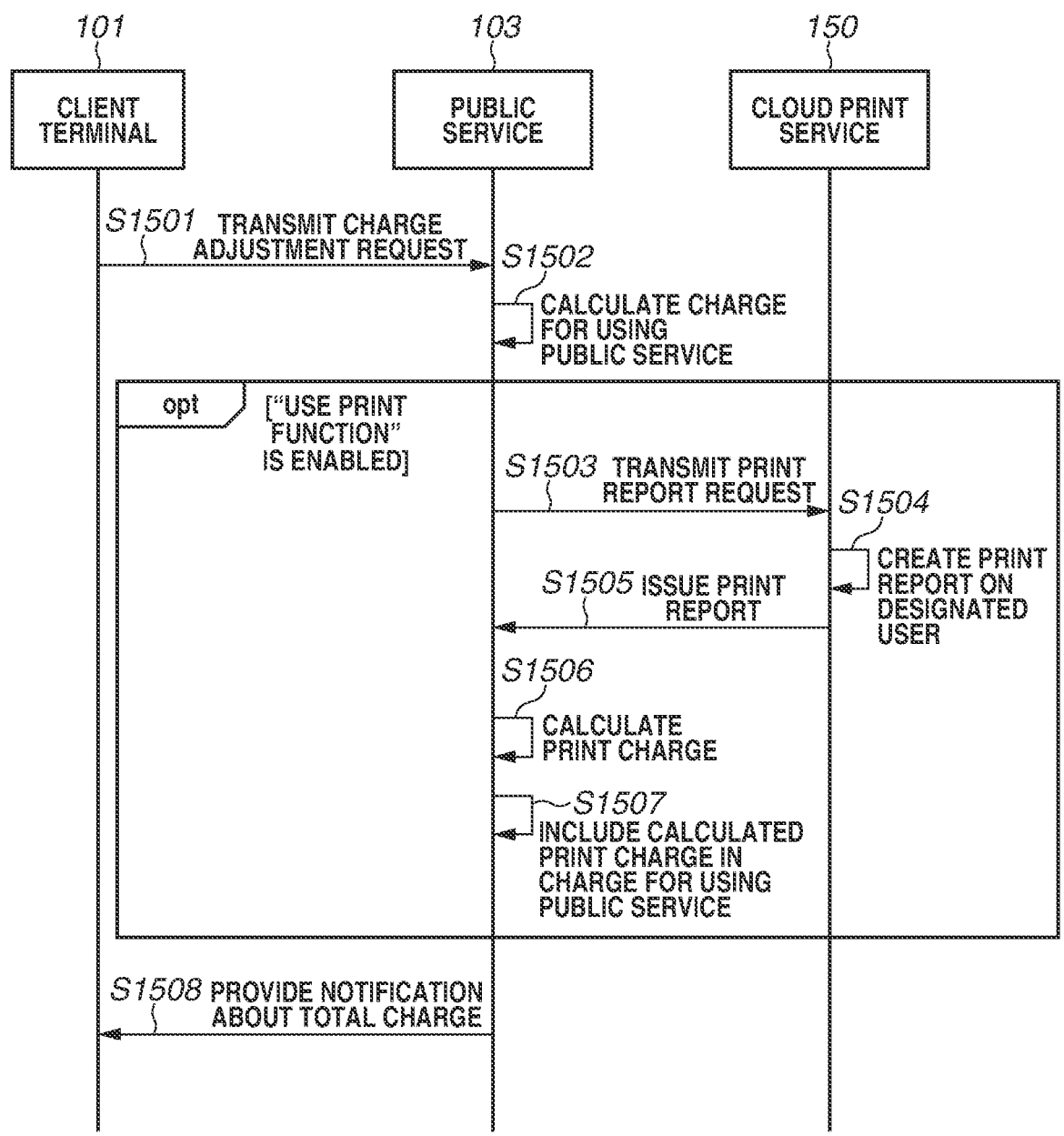
FIG. 15 is a sequence diagram illustrating charge adjustment processing by totalizing a charge for using a public service and a printing charge in the PS according to a second exemplary embodiment.

FIG. 15 is a sequence diagram illustrating charge adjustment processing by totalizing usage charges for using the public service and the printing charge in the PS 103 according to the second exemplary embodiment.

For example, a use case where a usage charge request is sent to the PS 103 using an application on the client terminal 101 will be described. In step S1501, the user or the shop administrator sends a usage charge adjustment request. In step S1502, the requested usage charges for using the public service by the user in the PS 103 are calculated. In this case, if the user enables the print function, in step S1503, a request for sending a print report about printing executed by the target user is transmitted to the CPS 150. In step S1504, the print log management unit 404 in the CPS 150 creates a print report about the designated user using print log information stored in the print log storage unit 4054. In step S1505, the created print report is transmitted to the PS 103. In step S1505, the print report may be transmitted in any data format, as long as the data indicates information (print history information) about a user print history. Any format other than a print report may be used. The data transmitted in step S1505 may indicate print log information stored in the print log storage unit 4054. In step S1506, the PS 103 calculates a printing usage charge based on a printing unit price included in the print report received from the CPS 150. In step S1507, the PS 103 performs processing for including the printing usage charge in the usage charges for using the public service in the shop. In step S1508, a notification about the total charge for using the shop is provided to the user.

The CPS 150 may calculate the printing usage charge using print log information stored in the print log storage unit 4054. In this case, the printing usage charge calculated by the CPS 150 is transmitted to the PS 103 in step S1505.

As described above, the printing usage charge calculated based on the print history information managed in the cloud print service is added to the shop usage charge managed in the public service, thereby making it possible to present the shop usage charge including the printing usage charge to the user.

According to an aspect of the present disclosure, it is possible to register information about respective services provided by a management system and a print system in the management system and the print system based on a registration request to be sent to the management system from a client terminal.

Other Embodiments

Some embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-140736, which was filed on Aug. 31, 2021 and which is hereby incorporated by reference herein in its entirety.

What is claimed is:

1. A system comprising:
a client terminal to be operated by a shop administrator;
a management system configured to provide a shop management service; and
a print system configured to provide a print service,
wherein the client terminal includes:
first one or more memories storing a set of first instructions; and
first one or more processors that execute the set of first instructions to:
transmit a first registration request for registering shop information, that includes device information about a printing apparatus, to the management system,
wherein the management system includes:
second one or more memories storing a set of second instructions; and
second one or more processors that execute the set of second instructions to:
receive the first registration request from the client terminal;
register the shop information corresponding to the first registration request in the management system; and
transmit, to the print system, a second registration request for registering the device information included in the shop information corresponding to the first registration request, and
wherein the print system includes:
third one or more memories storing a set of third instructions; and
third one or more processors that execute the set of third instructions to:
receive the second registration request from the management system;
register the device information corresponding to the second registration request in the print system;
issue a registration key for identifying the device information registered in the print system;
transmit the issued registration key to the management system, wherein the management system receives the issued registration key transmitted from the print system and provides a notification about the issued registration key to the client terminal;
receive, from the printing apparatus, the registration key input through an operation unit of the printing apparatus and connection information for connecting the print system to the printing apparatus; and
register the received connection information in association with the registered device information corresponding to the received registration key in the print system.

2. The system according to claim 1,
wherein in the management system, the issued registration key is registered in the management system in association with the shop information.

3. The system according to claim 1, wherein the device information includes at least one of a registered name, an IP address, a model name, and capability information about the printing apparatus.

4. The system according to claim 1,
wherein the third one or more processors further execute the set of third instructions to manage user print history information,
wherein the second one or more processors further execute the set of second instructions to calculate a shop usage charge for using a shop by a user, and
wherein the shop usage charge including a print usage charge for using printing by the user is calculated based on the managed print history information.

5. A control method for controlling a system, the system comprising a client terminal to be operated by a shop administrator, a management system configured to provide a shop management service, and a print system configured to provide a print service, the control method comprising:
transmitting, by the client terminal, a first registration request for registering shop information, that includes device information about a printing apparatus, to the management system;
receiving, by the management system, the first registration request from the client terminal;
registering, by the management system, the shop information corresponding to the first registration request in the management system;
transmitting, to the print system by the management system, a second registration request for registering the device information included in the shop information corresponding to the first registration request;
receiving, by the print system, the second registration request from the management system;
registering, by the print system, the device information corresponding to the second registration request in the print system;
issuing, by the print system, a registration key for identifying the device information registered in the print system;
transmitting, by the print system, the issued registration key to the management system;

receiving, by the management system, the issued registration key transmitted from the print system;

providing, by the management system, a notification about the issued registration key to the client terminal;

receiving, by the print system, from the printing apparatus the registration key input through an operation unit of the printing apparatus and connection information for connecting the print system to the printing apparatus; and registering, by the print system, the received connection information in association with the registered device information corresponding to the received registration key in the print system.

6. A management system that communicates with a client terminal and a print system, comprising:

one or more memories storing a set of instructions; and one or more processors that execute the set of instructions to:

receive a first registration request for registering shop information, that includes device information about a printing apparatus, from the client terminal;

register the shop information corresponding to the first registration request in the management system;

transmit, to the print system, a second registration request for registering the device information included in the shop information corresponding to the first registration request;

receive a registration key from the print system, wherein the print system issued the registration key for identifying the device information registered in the print system; and provide a notification about the received registration key to the client terminal, wherein the print system receives, from the printing apparatus, the registration key input through an operation unit of the printing apparatus and connection information for connecting with the printing apparatus, and registers the received connection information in association with the registered device information corresponding to the received registration key in the print system.

* * * * *